July 27, 1943.   C. G. MUENCH   2,325,338
APPARATUS FOR FELTING FIBROUS SHEETS
Filed Oct. 18, 1939   4 Sheets-Sheet 1
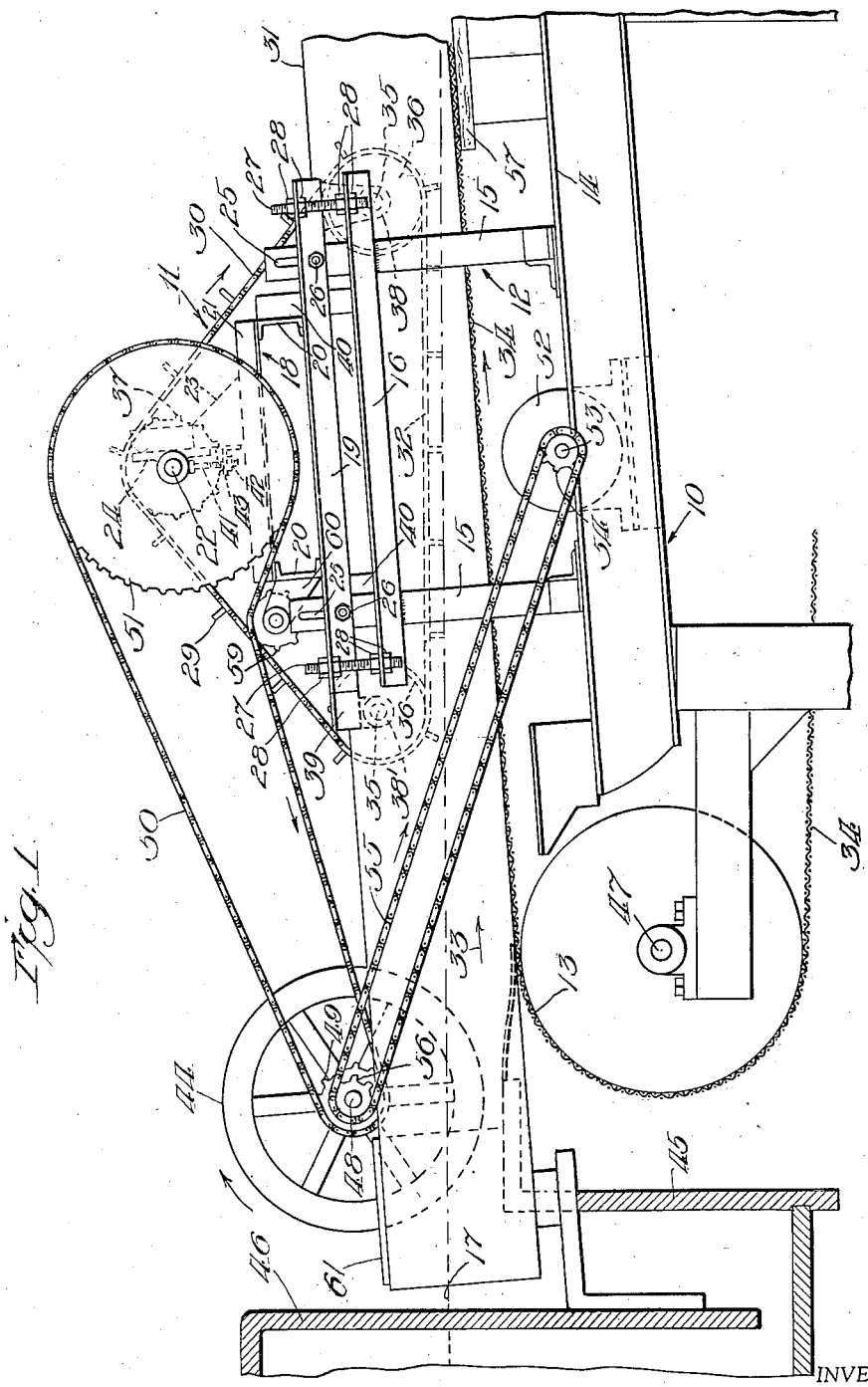
INVENTOR.
Carl G. Muench
BY Edw A Hampson
ATTORNEY.

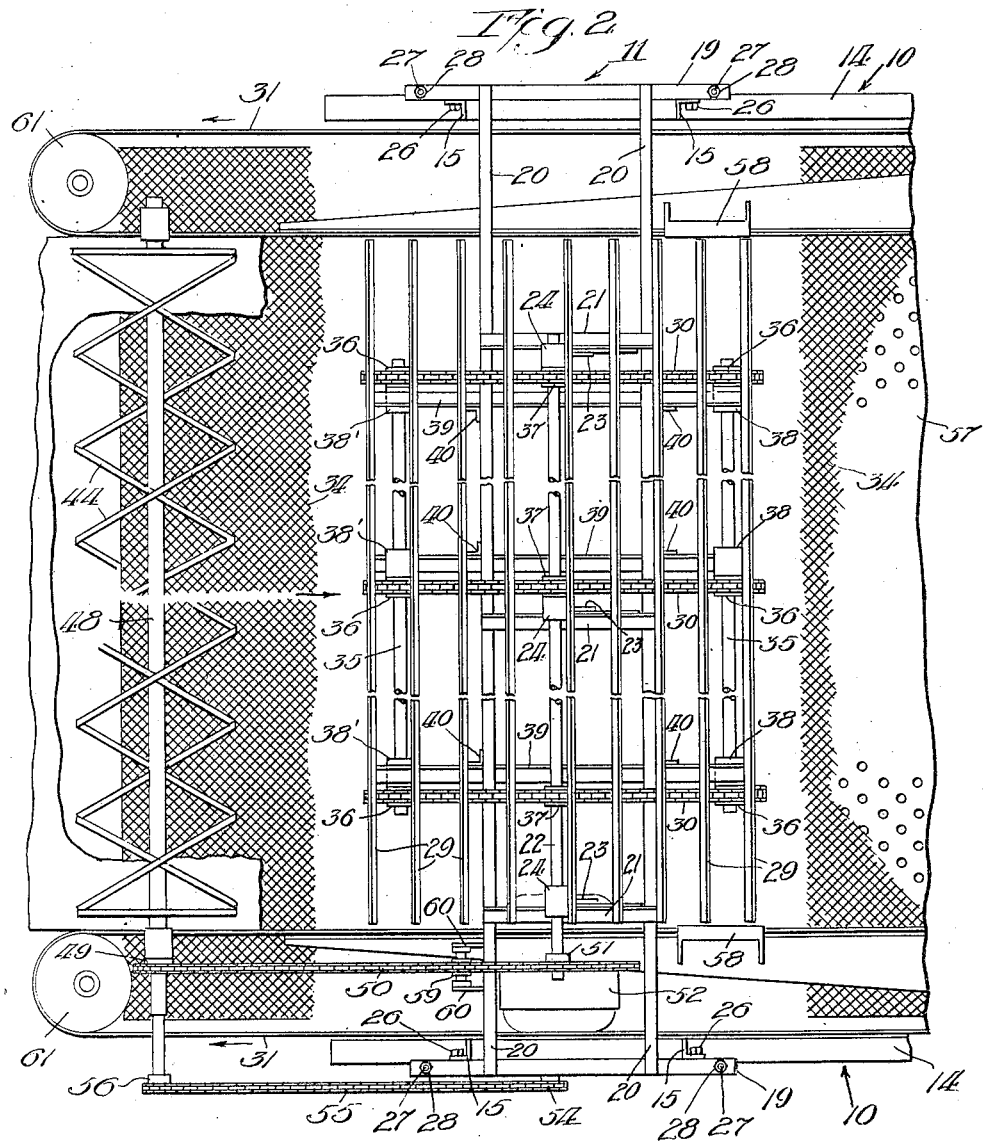

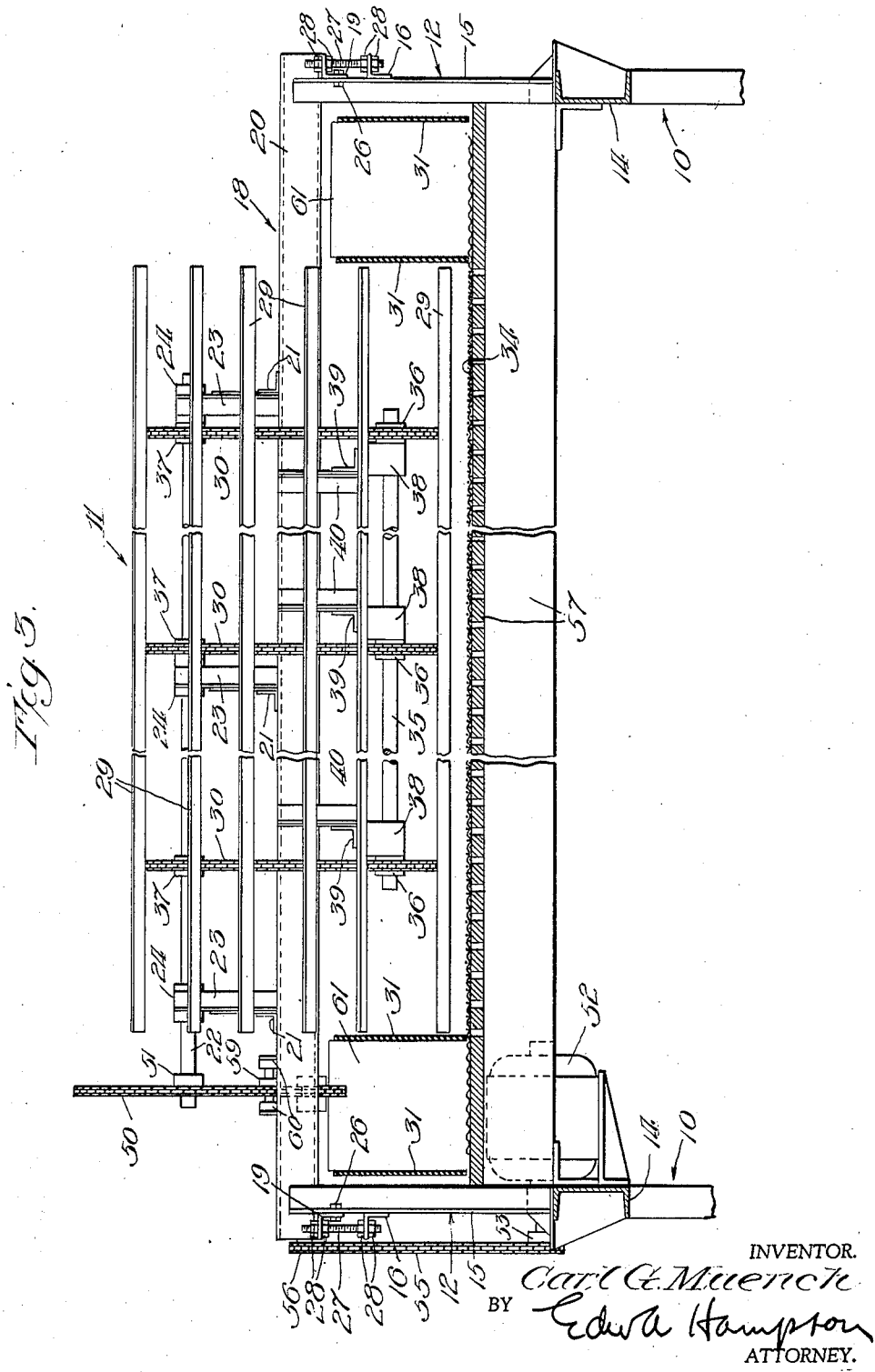

July 27, 1943.  C. G. MUENCH  2,325,338
APPARATUS FOR FELTING FIBROUS SHEETS
Filed Oct. 18, 1939   4 Sheets-Sheet
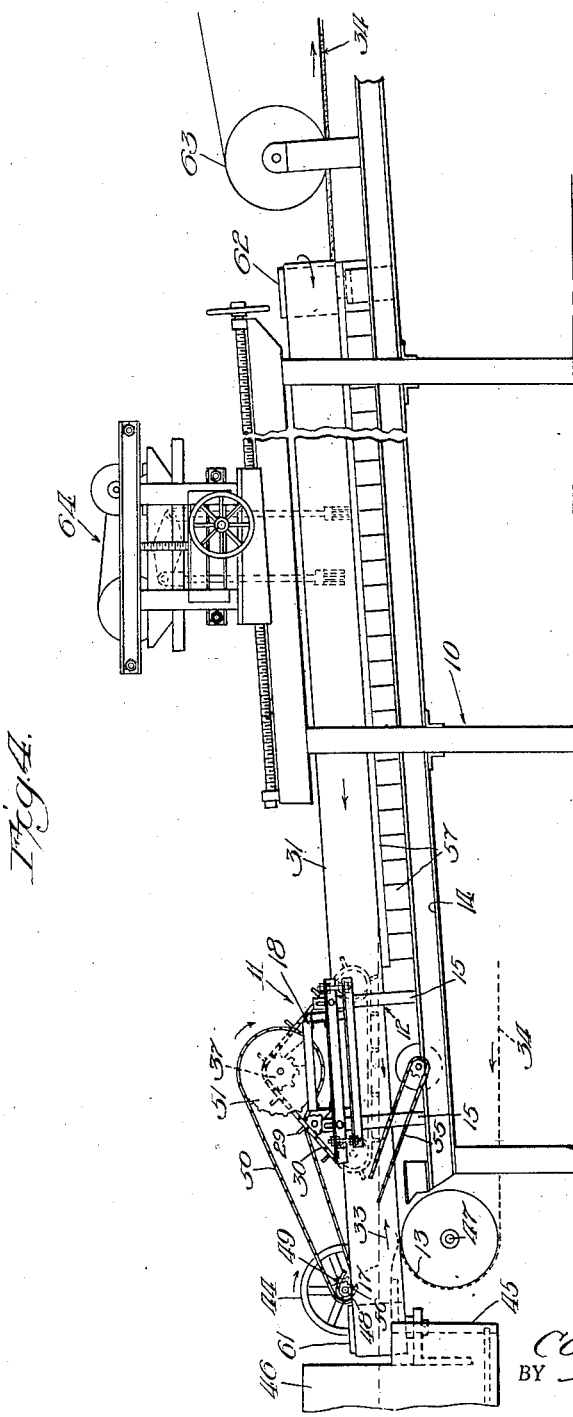
INVENTOR.
Carl G. Muench
BY Edw. A. Hampson
ATTORNEY.

Patented July 27, 1943

2,325,338

UNITED STATES PATENT OFFICE 2,325,338

APPARATUS FOR FELTING FIBROUS SHEETS

Carl G. Muench, New Orleans, La., assignor to The Celotex Corporation, Chicago, Ill., a corporation of Delaware Application October 18, 1939, Serial No. 300,046

2 Claims. (Cl. 92—44)

This invention relates to an apparatus for felting fibrous sheet material and more particularly relates to a skimming device on a Fourdrinier machine adapted for felting fibre board. A Fourdrinier machine to which this skimming device is applicable comprises essentially a felting screen, pressing felts, suction boxes, and a head box and a machine box from which the stock flows to felt on the screen.

The apparatus herein described for dissipating the foam and mixing the floating fibres with the stock involves skimming the surface of the pond in a direction opposite to the flow of the stock in the pond formed at the machine chest. The foam which rises on the surface of the pond is apparently caused by the agitation of the stock whereby a part of the sizing which is admixed with the stock of liquid and fibre, is ordinarily a rosin and alum size, apparently acts in the role of a surface depressing agent to cause bubbles to form in the stock and to rise to the surface of the pond as foam. This foam if allowed to be felted out on the finished sheet would leave stains on the finished surface necessitating an additional operation for their removal, as for example, sanding to provide a clean finished surface on the finished material. This foam which forms, however, is a disadvantage where it is desired to have the finished surface as that surface which is felted and pressed under the felts of the Fourdrinier machine or between the felts of a machine press or to have that surface further decorated by suitable embossing rolls. To avoid the necessity of a subsequent surface finishing operation there has been developed a novel method for dissipating the foam and causing any fine fibres floated thereby to be released to mix up in the stock.

The skimming device primarily consists of a conveyor having slats mounted thereon with a portion of the conveyor extending longitudinally with respect to the Fourdrinier machine and at an angle to the felting screen so that the slats dip slightly below the level of the pond whereby, as the slats move in a direction opposite to the flow of the liquid in the pond, they dissipate the foam and cause the floating fibres to be mixed with the stock in the pond.

The principal object of the invention is to provide an apparatus for skimming the foam and floating fibres which may be on the surface of the machine pond so that the foam apparently dissipates itself and the floating fibres are re-mixed with the stock in the pond formed at the machine chest of the Fourdrinier machine so that it is not necessary to further dispose of the foam and fibres by any overflow or similar device.

Another object of the invention is to use the skimming device in conjunction with the usual agitator for the pond of the Fourdrinier machine and tamping device for bringing the fines within the felted fibrous sheet to the surface of the sheet so that an excellent surface finish is had for the finished felted fibrous board without the necessity of subsequent surface finishing.

Another object of the invention is the provision of a skimming device comprising slats mounted on a conveyor wherein the slats dip slightly below the level of the liquid in the pond and move in a direction opposite to the flow of the liquid in the pond.

Another object of the invention is the provision of a skimming device with adjustments whereby the skimming device may be vertically adjustable relative to the surface of the liquid in the pond of the Fourdrinier machine and also provision of means for adjusting the skimming device so that it may be set at a slight angle or kept level.

Further objects and advantages will become apparent from the following detailed description of the preferred embodiment of the invention as illustrated in the accompanying drawings, wherein like reference characters indicate similar parts.

Referring to the drawings:

Figure 1 is a side elevation partly in section illustrating the skimming device in its relative position with respect to the breast roll of the Fourdrinier machine and the agitator for the pond;

Figure 2 is a plan view illustrating the device of Figure 1;

Figure 3 is an end elevation of the skimming device, showing partly in section the framework and deckles of the Fourdrinier machine; and, Figure 4 is a schematic view illustrating in side elevation the relative position of the skimming device with respect to the breast roll and agitator of the Fourdrinier machine and also the relative position of the skimming device with respect to the tamper for tamping the surface of the felted fibre sheet as it is formed.

Referring to Figures 1 and 4 of the drawings, the numeral 10 indicates the structural framework of the Fourdrinier machine which has mounted thereon a skimming device 11. The skimming device 11 is preferably supported by framework 12 adjacent to a breast roll 13 of the Fourdrinier machine and secured to a longitudinal structural frame member 14 of the framework 10. The supporting frame 12 of the skimming device comprises vertical uprights 15 to which there are welded or otherwise secured longitudinal frame members 16.

The skimming device 11 is provided with means for vertical adjustment so that the whole assembly may be vertically adjusted relative to the surface of the pond 17 and may be adjusted so that the skimming device may be set at a slight angle to the surface of the pond or kept level. The skimming device 11 has a main frame 18 which is adapted to be adjusted with respect to the supporting frame 12 and the longitudinal frame members 16.

The main frame comprises longitudinal members 19 spaced vertically from the longitudinal frame members 16 and adapted to be adjusted relative with respect to the members 16. Welded or otherwise secured to the frame members 19 are longitudinally spaced transverse members 20. The transverse members extend across the width of the Fourdrinier machine and are adapted to mount longitudinal supports 21 for the main drive shaft 22 of the skimming device. The longitudinal supports 21 are welded or otherwise secured to the transverse frame members 20 and have secured thereon bearing supports 23 for adjustably mounting bearings 24 in which the shaft 22 is journaled.

Adjustment of the main frame 18 vertically with respect to the supporting frame 12 is accomplished by having slots 25 at the upper end of the vertical frame members 15. The slots in conjunction with the securing means or bolts 26 allow the frame to be first loosened, and when it is adjusted to the desired position, the main frame 18 is clamped in its vertically adjusted or angularly adjusted position. The means provided for adjusting the main frame 18 with respect to the supporting frame preferably comprises vertical members 27. These members 27 are in the form of tension rods which are threaded for adjustment of the main frame 18 with respect to its supporting frame 12. The tension rods 27 are positioned as best illustrated in Figures 1, 3 and 4, and provide for vertical support of the frame 18 with respect to the supporting frame 12.

The main frame 18 is adjusted by vertically adjusting nuts 28 in threaded engagement with the tension rods 27. Leveling of the skimming device with respect to the pond level may be accomplished by loosening the upper nuts and adjusting the lower nuts for adjusting the longitudinal frame members 19 with respect to the frame members 16. Also adjustment of the angularity of the skimming device may be accomplished in the same manner by loosening the nuts 28 and then adjusting the frame member 19 or by adjusting the lower nuts 28 secured on either side of the frame members 16. It is obvious, in adjusting or leveling the skimming device, that the same adjustment is necessary on each side of the supporting frame. In setting the skimming device, it is preferable that the skimmers are set below the level of the surface of the pond.

The skimming is accomplished by slats 29 mounted on conveyor chains 30. The slats 29 and associated mechanism form means for dissipating the foam. It is preferred that the conveyor chain is made up of pintle chain lengths with an attachment at every eleventh link for mounting the slats thereon so that the slats are mounted preferably every 18 inches on the conveyor chain. These slats 29 which are set forth in the claims as means comprising transverse conveyor flights, as best illustrated in Figure 3, extend transversely across the width of the Fourdrinier machine and preferably at their ends spaced a slight distance from the inside longitudinally moving rubber deckles 31. The conveyor preferably travels in the direction of the arrows associated therewith, Figure 1, that is, the bottom flight 32 of the conveyor 30 moves in a direction, as indicated by an arrow 33, opposite to the direction of the flow of the liquid in the pond. It is also preferred that the slats 29 will dip into the liquid of the pond in order to skim the foam and floating fibers therefrom to thus prevent them from flowing onto the finished sheet as it is being felted on a wire screen 34 of the Fourdrinier machine.

The chain conveyor as shown in Figure 1 is preferably formed as a triangle with the lower flight 32 the base of the triangle and the apex of the triangle at the axis of the main shaft 22. Idler shafts 35 are at the other apexes of the triangle and have mounted thereon idler sprockets or rollers 36 similar to main drive sprockets 37 mounted on the main drive shaft 22. The sprockets 36 and 37, as shown in Figure 3, are in alignment and the idler shafts 35 are journaled in bearings 38 mounted beneath and secured to longitudinally extending frame members 39. The frame members 39 are supported beneath the transverse members 20 by vertical supports 40 welded or otherwise secured to the transverse members 20 and the longitudinal frame members 39.

The conveyor chain 30 for the wood flights or slats 29 is tightened by vertically adjusting the bearings 24 with respect to the bearing supports 23 by an adjusting mechanism 41 comprising a threaded member 42 adjustably mounted in a support 43 secured to the bearing support 23. It is obvious that it is necessary in adjusting the shaft 22 to adjust each mechanism 41 at each bearing support.

Having thus described the skimming device in detail, the driving mechanism for the skimming device will now be described. As was previously disclosed above, it is preferred that the bottom flight 32 of the skimming device shall move in a direction, as indicated by the arrow 33, which is opposite to the flow of the stock in the pond. The skimming device is located ahead of a spiral agitator 44 which provides for agitating the stock in a pond 45 of the Fourdrinier machine as the stock comes from the head box 46. The spiral agitator 44 is preferably formed of a double spiral having right and left hand spirals of the same pitch. The double spiral agitator is primarily used for agitation of the fibre in the pond and to prevent ridges being left on the fibre sheet as it is felted on the screen. It is preferred to drive the agitator and the skimming device from a shaft 47 on which is mounted the breast roll 13 over which the wire screen 34 travels on which the fibre sheet is felted at a rate from 63 inches per minute minimum to 156 inches per minute maximum although the sheet may be felted much faster. It is obvious, if the load of the agitator and skimming device is too great to be carried by the motor or power shaft which drives the felting screen 34, that the agitator and skimming device may be separately driven by a motor or from a suitable power shaft. The spiral agitator 44 is suitably mounted on a shaft 48 extending transversely across the Fourdrinier machine and suitably journaled in bearings mounted on the framework of the Fourdrinier machine. The agitator 44 serves to agitate the stock in the pond and is rotated within the range of from substantially 30 to 50 R. P. M. so that as the fibrous sheet is felted, a sheet which is uniform in character is produced.

Secured to the shaft 48 is a sprocket 49 over which runs a drive chain 50 which in turn drives a sprocket 51 which is affixed to the shaft 22 of the skimming device 11. The relative ratio of speeds of the agitator shaft 48 and main drive shaft 22 of the skimming device is such that as the agitator rotates at 30 R. P. M. the main drive shaft 22 rotates at substantially 13.6 R. P. M. The preferred range of speed at which the agitator is operated is from substantially 30 to 50 R P. M., although it may be operated even slower. It is preferred to drive the shaft 48 from a gear motor comprising a motor and reduction gearing, as indicated at 52, wherein a jack shaft 53 to which a sprocket 54 is attached is being rotated at substantially 54.5 R. P. M. The sprocket 54 through a chain 55 drives a sprocket 56 secured to the shaft 48 for driving the shaft 48 at 50 R. P. M. This mechanism disclosed above in detail has been defined in the claims as actuating means for the means for skimming the pond whereby the pond is skimmed in a direction opposite to the travel of the felting screen.

It is preferred that the flights 29 as they enter the pond 45 shall be, as indicated in Figure 1, adjacent to suction boxes 57 of the Fourdrinier machine. The preferred range of linear speed of the skimming apparatus is such that the flights 29 move at the rate of from 250 inches to 425 inches per minute although it may be even operated at a slower speed.

There is a tendency for the slats or flights 29 as they travel downwardly into the pond to become caught on the moving deckles 31. It is therefore a feature of the invention that suitable deflector plates 58, Figure 2, are mounted adjacent to the rubber deckles 31 where the flights 29 of the skimming device 11 pass down by the deckles. These deflector plates 58 are suitably mounted on gussets secured to the frame of the Fourdrinier machine which has not been shown and need not be indicated for the understanding of the invention.

Another feature of the invention is the provision of a suitable idler sprocket 59 and support 60 therefore for adjusting the tension in the drive chain 50 which drives the skimming device. It is preferred to mount the support 60 for the idler sprocket on one of the transverse main frame members 20 of the skimming device, Figures 1 and 2.

The details of the driving mechanism for actuating the rubber deckles 31 need not be described fully as the driving mechanism for these deckles 31 is not necessary for the understanding of the invention. Referring, however, to Figure 2, it is to be noted that the space between the deckle 31 and its return flight is utilized for space for the main drive of the skimming device and that the drive chain 55 for driving the agitator extends outside of the return flight of the deckle 31. The deckles 31 are mounted on deckle pulleys 61 and 62, and the deckles 31 are suitably driven by the forward deckle pulleys 62 through mechanism not shown. This mechanism is the usual deckle drive mechanism well known in the prior art and utilized on Fourdrinier machines of this type. The deckles 31 serve to adjust the width of the felted sheet before it passes, as illustrated in Figure 4, beneath a machine press felt 63 for further pressing and compacting of the sheet.

In the operation of the Fourdrinier for felting fibre board using the novel skimming device and method of operation, as herein disclosed, it is preferred to use this skimming device either alone or in conjunction with a tamping mechanism 64, illustrated schematically in Figure 4. The tamping device is preferably positioned between the skimming device and the first felt of the Fourdrinier press and over the suction boxes. This tamping device and the method of its operation are disclosed and claimed in a co-pending application of Carl G. Muench, Serial No. 300,045, filed October 18, 1939, of which this application is a continuation in part.

The stock as it comes from the head box 46 into the pond 45 reaches a predetermined level as indicated at 17. The stock may comprise ligno-cellulose fibre, preferably bagasse fibre, which has been given a light digestion and then subjected to a suitable refining in either a Claflin or Jordan or other refiner to reduce the fibre to a suitable fineness. This refined fibre may have admixed therewith other fibre and be then sized as with rosin size precipitated on the fibres by alum. At the head box there may also be added certain treatments for fire-proofing or certain toxic treatments for fungus and insect-proofing the finished felted fibre board.

Although this invention has been described in connection with felting of bagasse fibre, the novel skimming device is equally adaptable in connection with the formation of sheets made from ground wood or any other suitable fibres. The pond is preferably agitated by the spiral agitator 44 to maintain the stock at uniform consistency so that as the stock is felted on the screen 34 of the Fourdrinier machine a felted fibre sheet of uniform character is had. As the stock is agitated in the pond, however, there is a tendency for a foam to form and also the fine fibres and occluded fibres in the foam to float to the surface which foam with its fibre content and fine fibre, if allowed to felt onto the finished surface of the sheet, would form stains and irregularities in the finished surface making it necessary to sand the finished sheet or otherwise process the surface to remove the stains and irregularities. If felted onto the sheet, in connection with the manufacture of which embossing rolls are used in conjunction with the felting operation to emboss a design thereon, there would be formed stains on the embossed surface which could not be readily removed and thus there would not be produced on the sheet a finished surface pleasing to the eye.

The stains which arise from a deposit of the foam on the surface of the sheet are perhaps due to the effect of the rosin size in decreasing the surface tension whereby the action of the agitator causes bubbles to form in the stock and which, in rising to the surface, float to the surface particles of dirt and fine fibres to form on the surface of the pond a foam having therein such dirt particles and fine fibres which are floated from the stock and are in the water used in making up the furnish. It has been found, however, that by using the novel method and apparatus disclosed these stains which have previously appeared no longer form as the foam is caused to be dissipated and the fine fibres and dirt particles floated thereby caused to mix back into the stock in the pond. It is preferred to operate and to adjust the skimming device so that the slats or flights dip into the surface below the pond level to a sufficient depth to convey the foam and the floating fibres in a direction opposite to the direction of flow of the liquid in the pond in order to bring and to keep the foam within the sphere of action of the spiral agitator whereby the foam is dissipated, and any particles or fine fibre which were carried thereby are released and which were floating on the surface of the pond are by the action of the agitator again admixed throughout the stock in the pond. The structure for accomplishing this function has been defined in the claims as means for conveying the foam and floating fibre in a direction opposite to the flow of the liquid in the pond and contiguous to the agitator whereby the foam is dissipated and the floating fibre admixed with the furnish.

As the fibres are felted on the wire, the fibre sheet which has not been indicated in the drawings as it is not believed necessary for an understanding of the invention, travels forwardly over the suction boxes 57 where the greater portion of the water is removed from the felted sheet. At this point, it may also be desirable to use the tamping device 64, illustrated diagrammatically in Figure 4 and disclosed and claimed in the copending application mentioned above, to tamp the finished surface of the felted sheet to cause the finer fibre particles in the sheet to arise to the surface, thus forming a sheet which has a fine textured surface and a denser and harder surface than that formed on the opposite untamped side of the felted sheet.

It is not, however, necessary that the tamper be used in conjunction with the skimming device or the skimming device in conjunction with the tamper. Each may be used separately or in conjunction with the other depending upon the type of finished surface which is desired. Referring to Figure 4, as the felted sheet leaves the skimming device and the tamping device, it passes underneath the pressing felt 63 of the Fourdrinier machine which further presses and compacts the sheet to its finished thickness and also removes any excess of water therefrom.

It is obvious that there has been disclosed in the foregoing description a novel apparatus for skimming the foam or bringing about the dissipation of foam formed on a pond of a Fourdrinier machine so that the resulting finished, felted fibre sheet or board is not deleteriously affected by a deposit of foam on the surface of the sheet as it is being formed, as for instance, being stained by the included particles in the foam. Furthermore, there has been disclosed a novel apparatus for dissipating this foam and mixing the fibres floated thereby or floating on the surface of the pond back into the stock from which the sheet is felted. Also, the apparatus has been disclosed in conjunction with the usual agitator for the stock from which the sheet is felted, and a novel tamping mechanism for further finishing the surface of the felted sheet.

While the construction above described exemplifies a preferred form of the invention, it will be obvious to those skilled in the art that various modifications of the preferred apparatus are possible without departure from the scope of the invention as defined in the following claims.

What is claimed is:

1. In combination in a machine for felting a fibrous sheet, a head box, a breast roll having an upwardly inclined machine wire running thereover, the breast roll spaced from the head box, a machine chest providing for a machine pond of stock therebetween, a partially submerged agitator mounted operatively for agitation of stock in the machine pond and for agitation of foam on the surface thereof, and a machine pond skimming mechanism positioned substantially over the machine wire adjacent the breast roll and operative to skim floating froth and fine fibers floating on the surface of the wire furnish and to return such back to the surface of the machine pond and to the sphere of action of the agitator.

2. In the production of a felted fibrous sheet on a felting machine comprising a head box, a breast roll having an upwardly inclined machine wire running thereover, the breast roll being spaced from the head box and providing a machine pond therebetween and extending as a wire pond over the breast roll and wire adjacent thereto; the method of preventing surface staining of board made thereon due to the deposit of scum and loose fine fibers on the surface thereof, which comprises furnishing a liquid fiber stock to the machine, which stock incidental to its flow through the machine results in the formation of foam floating on the surface of the machine stock pond, then skimming the surface of the stock pond over the machine wire but adjacent the breast roll in a direction opposite to that of the flow of the stock whereby the floating foam and liquid material suspended thereby is returned to and concentrated on the surface of the main body of the stock pond, and then agitating and admixing such concentrated floating foam back into the body of the main stock pond whereby such concentrated foam is dissipated and the solids thereof returned to the fluid stock in the main body of the machine stock pond.

CARL G. MUENCH.